(No Model.)

J. P. BROWN.
NUT LOCKING DEVICE.

No. 575,414. Patented Jan. 19, 1897.

WITNESSES. INVENTOR.
Charles T. Hannigan James P. Brown
Carlos L. Rogers by Thomas F. Bornefield
Atty.

UNITED STATES PATENT OFFICE.

JAMES P. BROWN, OF PAWTUCKET, RHODE ISLAND.

NUT-LOCKING DEVICE.

SPECIFICATION forming part of Letters Patent No. 575,414, dated January 19, 1897.

Application filed October 5, 1896. Serial No. 607,828. (No model.)

*To all whom it may concern:*

Be it known that I, JAMES P. BROWN, a citizen of the United States, residing in the city of Pawtucket, in the county of Providence and State of Rhode Island, have invented certain Improvements in Lock-Nuts, of which the following is a specification.

My said invention relates to a nut-locking device; and it consists in placing under the nut a shaped and slotted washer having an interior lug fitted into a longitudinal groove in the surface of the bolt and adapted to receive an angular-sided key, which is placed in its slot and then turned upward into a notch in said washer and into an angular groove in the side of the nut.

The accompanying drawings are made part of this specification, similar letters of reference thereon indicating corresponding parts.

Figure 1 of said drawings is a perspective view of a timber $s\ s$, through which a bolt has been passed and the nut screwed down on the threaded end and locked by means of my slotted washer and angular-sided key. In this figure, $a$ represents the head of the bolt, and $c\ c$ the body of the same. $d\ d$ is the nut; $e$, the key turned up into said notch and the angular groove in the side of the nut, and $i\ i$ show the washer aforesaid.

Figure 2:
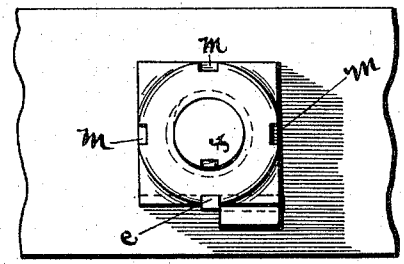
Fig. 2 is a top view and plan of the parts shown in Fig. 1, $m\ m$ showing the groove in each of the four sides of the nut, and $f$ indicating the longitudinal groove in the surface of the bolt.
Figures 1, 3, 7:
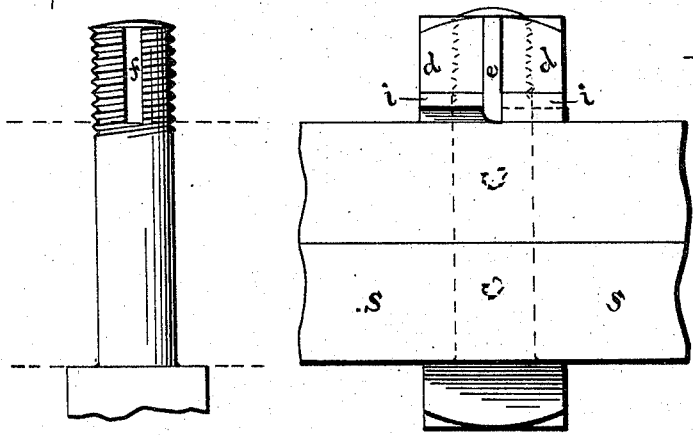
Fig. 3 is a detached view of the grooved nut and washer, the slot in the latter for receiving the key being shown at $n$.
Fig. 7 is a view of the bolt whose surface is grooved, as shown at $f$, to receive the lug $h$ of said washer.
Figure 4:
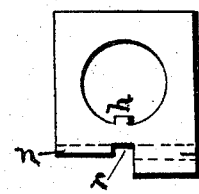
Fig. 4 is a separate view in perspective of the washer, showing its shape and interior lug $h$, while its under slot is indicated by the dotted lines.
Figure 5:
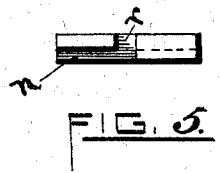
Fig. 5 is an elevation of the edge of the washer which has been slotted and notched at $r$ for the purposes aforesaid.
Figure 6:
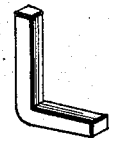
Fig. 6 is a perspective of the angular key for locking the whole device together.

The angular notch $r$ in the edge of the washer will register with the like groove $m$ in the side of the nut. On one side of this notch $r$ the washer is cut away about one-half of the depth of the notch to permit the passage of the upright end of the key when said key is slid into the part of the slot $n$ shown by the dotted lines in Figs. 4 and 5 and at $n$ in Fig. 3.

The application and operation of my said device are as follows: The bolt is inserted in the usual way and the slotted and notched washer is placed over the threaded end of it in such manner that the lug $h$ will fit into the groove $f$. The washer is made to lie flat upon and its under slot $n$ closely against the surface of the part $s\ s$. The nut is screwed down on the threaded end of the bolt and so left that the angular groove $m$ in one of its sides will exactly register with the notch $r$ in the edge of the washer. The shorter arm of the key is then slid into the under slot $n$ of the washer and from the side of the washer that has been cut away to facilitate this movement, and when the longer arm of the key has reached the registered groove and notch $m\ r$ it is turned upward and into the said notch and groove, and the several parts are then securely locked together. The interfitting of the angular surfaces of said key and groove and notch and slot, combined with the fitting of the lug $h$ into the groove $f$ in the side of the bolt, prevents the possibility of the key turning or working loose, and no ordinary use or jarring to which they may be subjected will cause the parts to separate or the nut to unlock. It will facilitate the convenient use of the key if its longer arm be moderately twisted from the perpendicular with reference to the shorter arm, thus enabling said longer arm to be more easily pushed along when the shorter end enters the closed part of the slot $n$.

The thickness of the washer will be varied to correspond with the varying degrees of strength that may be required from the locking device in the different uses to which it may be put.

Having thus described my said device, what I claim as new, and desire to secure by Letters Patent, is—

A nut-locking device consisting of a washer underneath the nut provided with its interior lug $h$ adapted to fit into a longitudinal groove in the side of the bolt, and having the slot $n$ and notch $r$, the latter registering with a corresponding angular groove in the side of the nut, together with an angular-sided key to be inserted in said slot and fitted into the angular groove and notch aforesaid: all of said parts being constructed and used in the manner and for the purposes substantially as shown and described.

JAMES P. BROWN.

Witnesses:
 THOMAS P. BARNEFIELD,
 CARLOS L. ROGERS.